United States Patent
Wolff et al.

(10) Patent No.: US 9,538,429 B2
(45) Date of Patent: Jan. 3, 2017

(54) MANAGING TRANSMISSION DEPENDENT HANDOVERS

(71) Applicant: Verizon Patent and Licensing Inc., Arlington, VA (US)

(72) Inventors: David Wolff, Costa Mesa, CA (US); Nischal Patel, Gilberts, IL (US); John Cooke, Cary, IL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 111 days.

(21) Appl. No.: 14/495,176

(22) Filed: Sep. 24, 2014

(65) Prior Publication Data

US 2016/0088527 A1    Mar. 24, 2016

(51) Int. Cl.
*H04W 4/00* (2009.01)
*H04W 36/00* (2009.01)
*H04W 36/26* (2009.01)

(52) U.S. Cl.
CPC ......... *H04W 36/0055* (2013.01); *H04W 36/26* (2013.01)

(58) Field of Classification Search
CPC ............. H04W 36/00; H04W 36/0061; H04W 36/0083; H04W 36/0094; H04L 1/0002; H04L 1/20

USPC .......................................................... 455/436
See application file for complete search history.

(56) References Cited

U.S. PATENT DOCUMENTS

| 8,903,393 B2 * | 12/2014 | Payyappilly | .......... | H04W 36/26 370/331 |
| 2014/0194121 A1 * | 7/2014 | Lindoff | ................. | H04W 36/24 455/436 |

OTHER PUBLICATIONS

Wikipedia, "Handover", http://en.wikipedia.org/wiki/Handover, Jun. 10, 2014, 7 pages.
ShareTechnote, "Handover", http://www.sharetechnote.com/html/Handover_LTE.html, Jul. 24, 2011, 18 pages.

* cited by examiner

*Primary Examiner* — Huy C Ho

(57) ABSTRACT

A device may receive information regarding a communication session associated with a user device and may determine, based on the received information, a type of communication session associated with the communication session. The device may determine, based on the determined type of communication session, handover parameters associated with the communication session and may transmit the handover parameters to the user device. The device may receive information associated with the signal information for one or more other devices and may initiate, based on the received information, a handover operation associated with the user device.

20 Claims, 11 Drawing Sheets

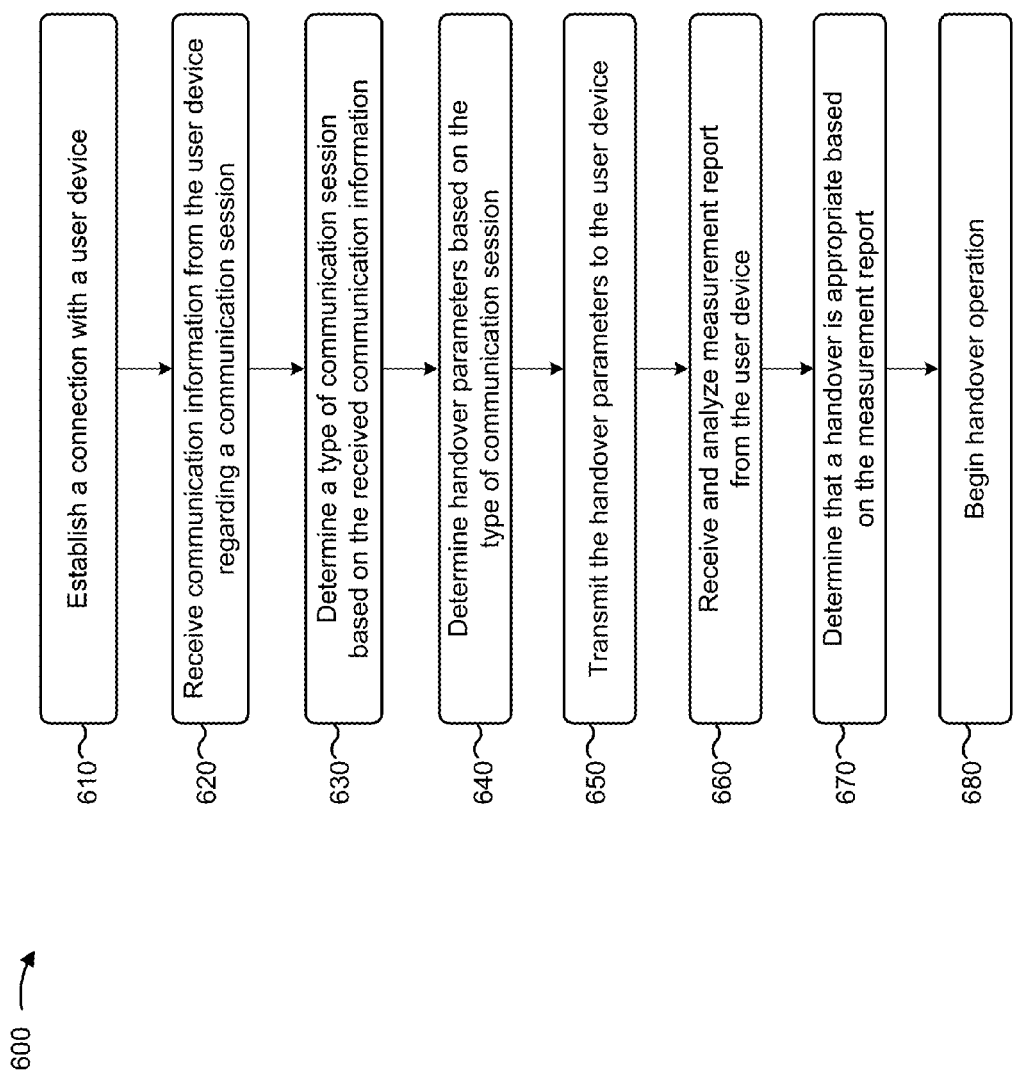

MANAGING TRANSMISSION DEPENDENT HANDOVERS

BACKGROUND

A user device may communicate with a base station to receive and transmit information. Based on a type of the communication session associated with the user device, a desired quality of service associated with the communication session should be maintained.

BRIEF DESCRIPTION OF THE DRAWINGS

FIG. 6 is a flow chart of an example process for managing handover parameters.

DETAILED DESCRIPTION OF PREFERRED EMBODIMENTS

The following detailed description of example implementations refers to the accompanying drawings. The same reference numbers in different drawings may identify the same or similar elements.

A connection between a user device and a base station may be used to handle communication sessions. In some situations, there may be one or more connections between a particular user device and a particular base station at any one time, and each connection may be associated with one or more communication sessions. Based on a type of communication session, of the one or more communication sessions, the base station may determine handover parameters for the communication session. The handover parameters may include information that is used by the base station and/or the user device to determine if the communication session should be handed over to another base station when the other base station satisfies the handover parameters. The handover parameters may include information that identifies the type of communication session and a signal strength parameter associated with the type of communication session. When the handover parameters are satisfied (e.g., when the signal strength of signals from the other base station satisfies the signal strength parameter associated with the type of communication session), the base station may instruct the user device and/or the other base station to hand over the communication session to the other base station.

Figure 1A:
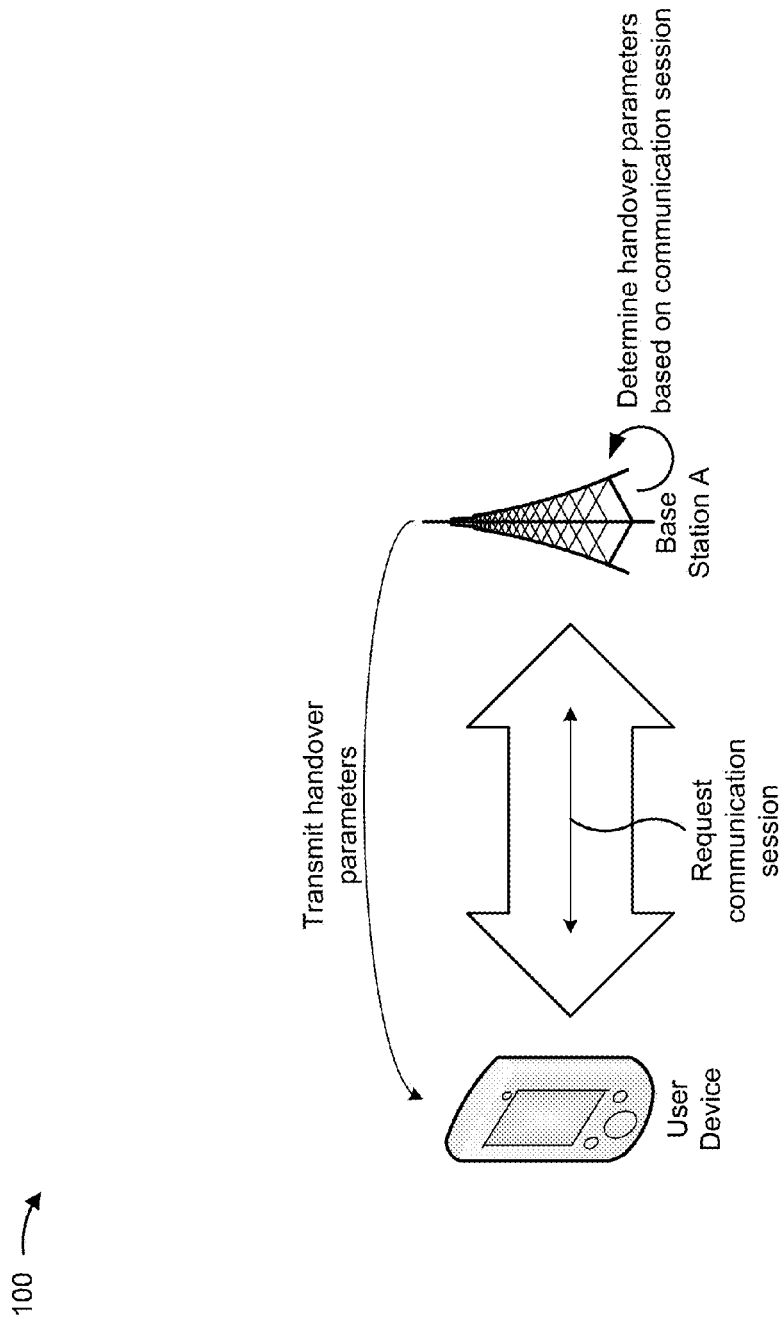
FIGS. 1A and 1B are diagrams of an overview of an example implementation described herein.
Figure 1B:
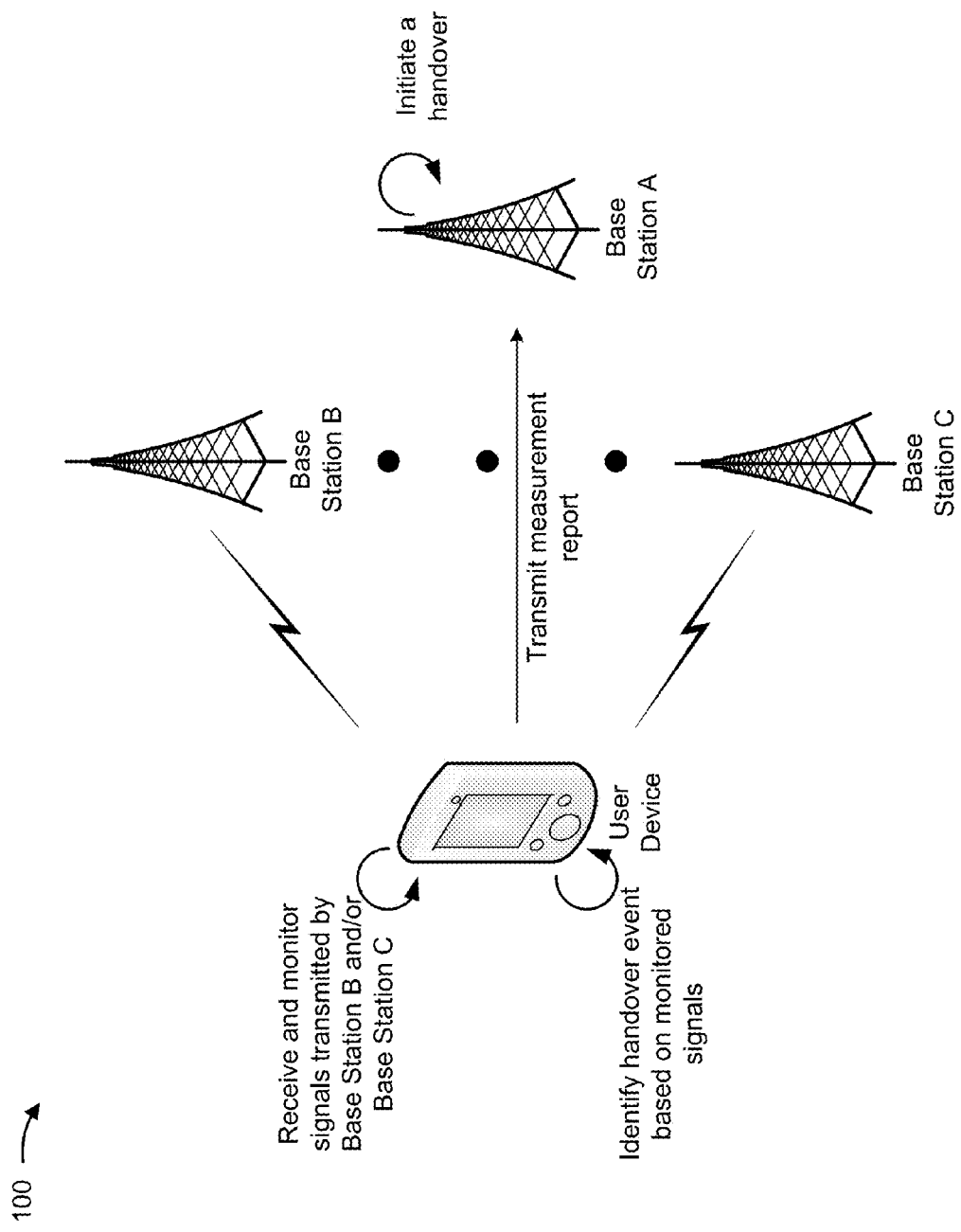

FIGS. 1A and 1B are diagrams of an overview of an example implementation 100 described herein. For the purposes of example implementation 100, and as shown in FIG. 1A, assume that base station A receives a request from a user device to establish a communication session with base station A. Based on receiving the request, base station A may determine the handover parameters that correspond to a type of the communication session and may transmit the handovers parameters to the user device.

As shown in FIG. 1B, assume that the user device receives the handover parameters. The user device may identify a signal strength parameter associated with the handover parameters, and may receive signals from another base station (e.g., base station B and/or base station C). The user device may monitor the received signals and may identify a handover event when the signal strength of the received signals satisfies the signal strength parameter.

Assume that the signal strength of the received signals from base station B satisfies the signal strength parameter. The user device may transmit a measurement report to base station A that includes information identifying base station B and the signal strength of the received signals from base station B. Based on the measurement report, base station A may initiate a handover to cause the user device to establish a connection with base station B and hand over the communication session to base station B using the established connection between the user device and base station B. In this way, each type of communication session may be associated with handover parameters, and the handover parameters may be used to determine if a communication session should be handed over when the handover parameters, associated with the communication session, are satisfied.

Figure 2:
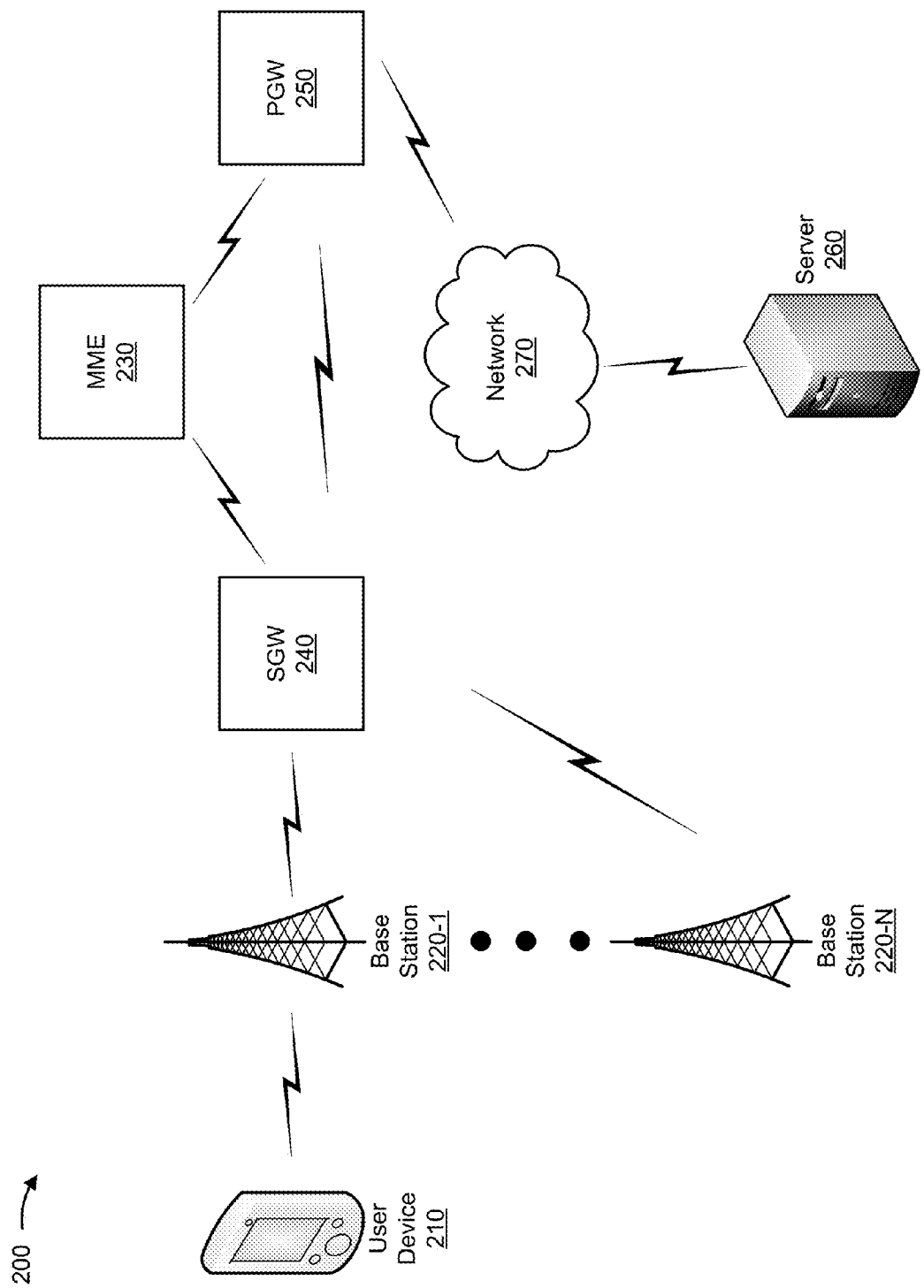
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more base stations 220-1 through 220-N (N≥1) (hereinafter referred to collectively as base stations 220, and individually as base station 220), a mobility management entity (MME) 230, a serving gateway (SGW) 240, a packet data network gateway (PGW) 250, a server device 260, and a network 270. Devices of environment 200 may interconnect via wired connections, wireless connections, or a combination of wired and wireless connections.

Some implementations are described herein as being performed within a long term evolution (LTE) network for explanatory purposes. Some implementations may be performed within a cellular network that is not an LTE network, such as a 3G network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 220 that take the form of evolved Node Bs (eNBs) via which user device 210 can communicate with the EPC. The EPC may include MME 230, SGW 240, and/or PGW 250 that enable user device 210 to communicate with network 270.

User device 210 may include one or more devices capable of receiving, generating, processing, storing, and/or providing information. For example, user device 210 may include a mobile phone (e.g., a smart phone), a mobile station, a radiotelephone, a video phone, a personal communications systems (PCS) terminal (e.g., that may combine a cellular radiotelephone with data processing and data communications capabilities), a computer (e.g., a desktop computer, a laptop computer, a tablet computer, etc.), a video game console, a set-top box, or a similar type of device capable of communicating with base station 220. User device 210 may establish one or more connections with base station 220, and may establish one or more communication sessions via each connection.

Base station 220 may include one or more devices capable of receiving, generating, processing, storing, and/or providing network traffic, such as media, audio, video, text, and/or other traffic, destined for and/or received from user device 210. In some implementations, base station 220 may include an eNodeB associated with a long term evolution (LTE) network that receives traffic from and/or sends traffic over network 270 via a packet data network gateway and/or a serving gateway. Additionally, or alternatively, base station 220 may be associated with a radio access network other than an LTE network. Base station 220 may send traffic to and/or receive traffic from user device 210 via an air interface. Base station 220 may establish a communication session with user device 210. In some implementations, base station 220 may include a small cell base station, such as a base station of a microcell, a picocell, and/or a femtocell.

MME 230 may include one or more devices, such as one or more server devices, capable of managing authentication, activation, deactivation, and mobility functions associated with user device 210. In some implementations, MME 230 may perform operations relating to authentication of user device 210. Additionally, or alternatively, MME 230 may facilitate the selection of a particular SGW 240 and/or a particular PGW 250 to serve traffic to and/or from user device 210. MME 230 may perform operations associated with handing off user device 210 from a first base station 220 to a second base station 220 when user device 210 is transitioning from a first cell associated with the first base station 220 to a second cell associated with the second base station 220. Additionally, or alternatively, MME 230 may select another MME (not pictured), to which user device 210 should be handed off (e.g., when user device 210 moves out of range of MME 230).

SGW 240 may include one or more devices capable of routing packets. For example, SGW 240 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 240 may aggregate traffic received from one or more base stations 220 associated with the LTE network, and may send the aggregated traffic to network 270 (e.g., via PGW 250) and/or other network devices associated with the EPC and/or an Internet protocol (IP) multimedia subsystem (IMS) core. SGW 240 may also receive traffic from network 270 and/or other network devices, and may send the received traffic to user device 210 via base station 220. Additionally, or alternatively, SGW 240 may perform operations associated with handing off user device 210 to and/or from an LTE network.

PGW 250 may include one or more devices capable of providing connectivity for user device 210 to external packet data networks (e.g., other than the depicted EPC and/or LTE network). For example, PGW 250 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 250 may aggregate traffic received from one or more SGWs 240, and may send the aggregated traffic to network 270. Additionally, or alternatively, PGW 250 may receive traffic from network 270, and may send the traffic to user device 210 via SGW 240 and base station 220.

Server device 260 may include one or more devices capable of receiving and/or providing information over a network (e.g., network 270), and/or capable of generating, storing, and/or processing information received and/or provided over the network. For example, server device 260 may include a computing device, such as a server (e.g., an application server, a content server, a host server, a web server, etc.) or a similar device. Server device 260 may receive information from and/or provide information to user device 210 (e.g., via network 270 and/or base station 220) and/or base station 220.

Network 270 may include one or more wired and/or wireless networks associated with providing a service to user device 210. For example, network 270 may include a cellular network (e.g., an LTE network, a 3G network, a code division multiple access (CDMA) network, etc.), a public land mobile network (PLMN), a wireless local area network (WLAN) (e.g., a Wi-Fi network), a local area network (LAN), a wide area network (WAN), a metropolitan area network (MAN), a telephone network (e.g., the Public Switched Telephone Network (PSTN)), a near field communication (NFC) network, a Bluetooth network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
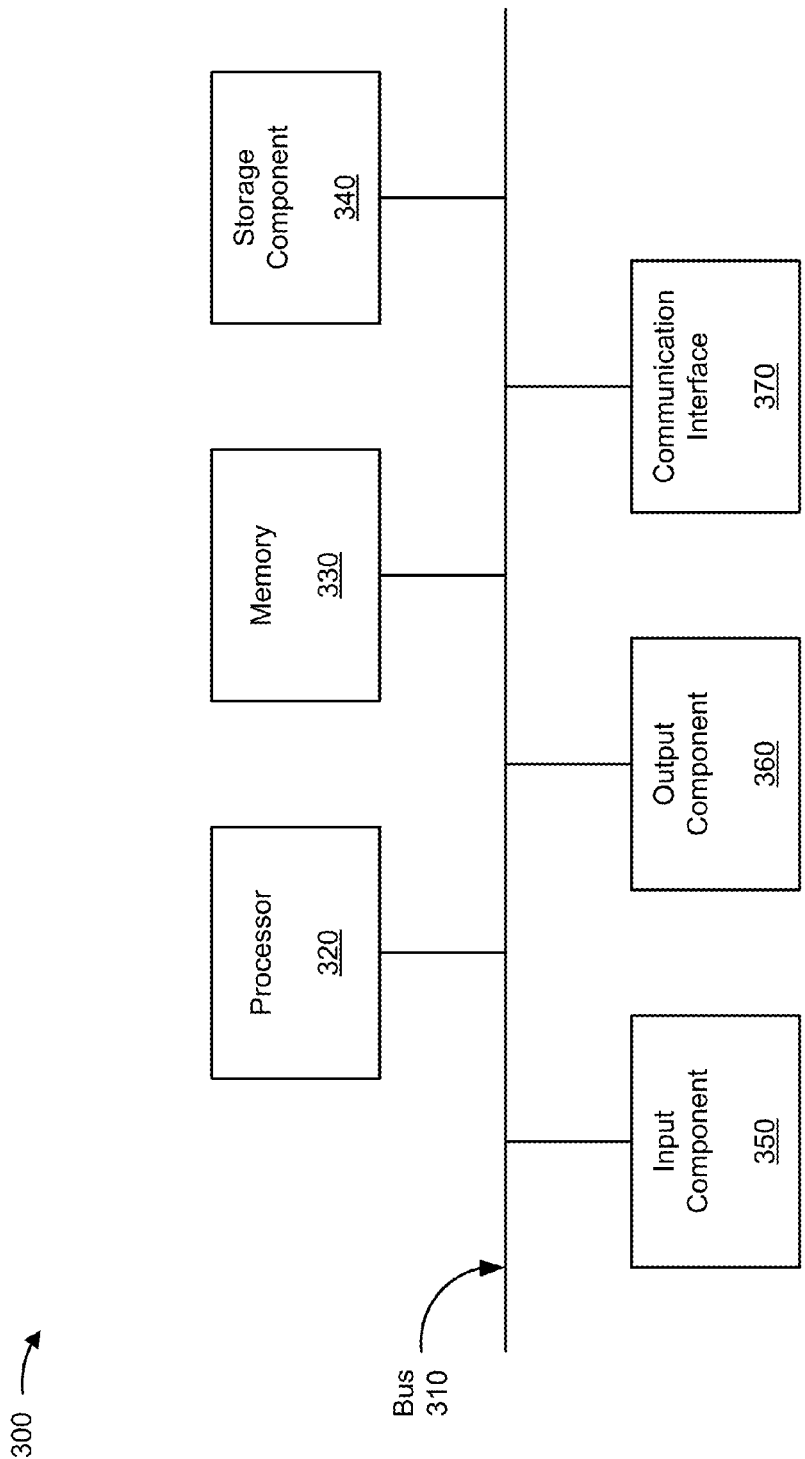
FIG. 3 is a diagram of example components of one or more devices of FIG. 2.

FIG. 3 is a diagram of example components of a device 300. Device 300 may correspond to user device 210, base station 220, MME 230, SGW 240, PGW 250, and/or server device 260. In some implementations, each of user device 210, base station 220, MME 230, SGW 240, PGW 250, and/or server device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
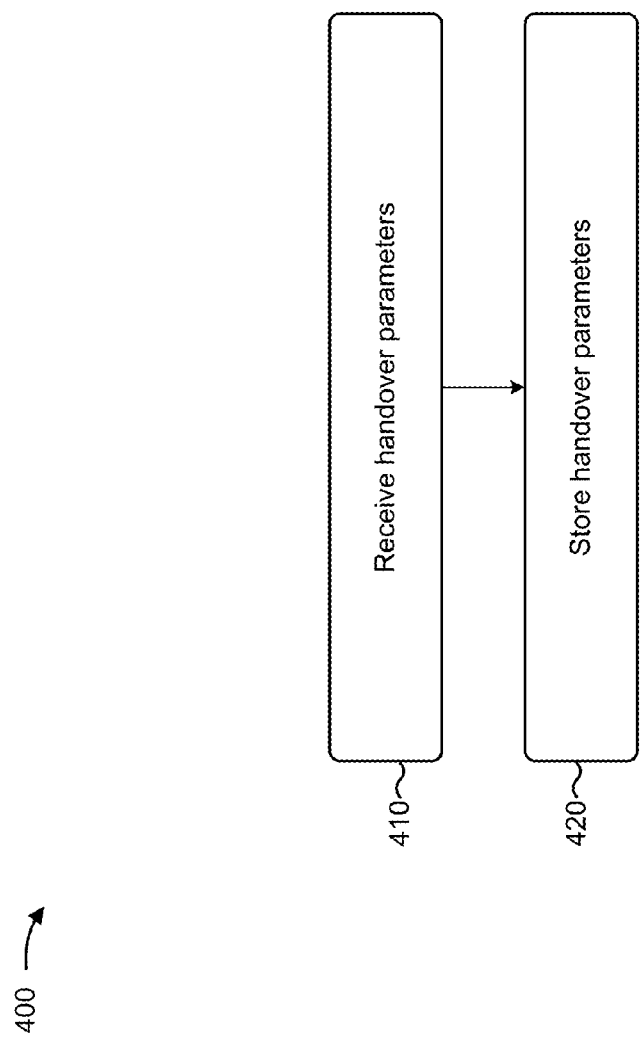
FIG. 4 is a flow chart of an example process for receiving and storing handover parameters.

FIG. 4 is a flow chart of an example process 400 for receiving and storing handover parameters. In some implementations, one or more process blocks of FIG. 4 may be performed by base station 220. Additionally, or alternatively, one or more process blocks of FIG. 4 may be performed by another device or a group of devices separate from or including base station 220, such as user device 210 and/or server device 260.

As shown in FIG. 4, process 400 may include receiving handover parameters (block 410). For example, base station 220 may receive handover parameters. In some implementations, base station 220 may receive the handover parameters from server device 260. In some implementations, a system operator may generate handover parameters for different types of communication sessions, the handover parameters may be stored by server device 260, and server device 260 may provide the handover parameters to base station 220. Upon initialization of base station 220, base station 220 may request the handover parameters from server device 260, and server device 260 may provide the handover parameters. In some implementations, server device 260 may transmit the handover parameters to base station 220 during initialization of base station 220 and/or at another time (e.g., during an establishment of a connection between user device 210 and base station 220, during a communication session between user device 210 and base station 220, or the like). Server device 260 may also transmit the handover parameters to base station 220 without receiving a request from base station 220 for the handover parameters.

Handover parameters may include information regarding a communication session and information regarding a parameter corresponding to the communication session. The parameter may include signal information, such as a signal strength parameter, a signal quality parameter, a time to trigger parameter, a report interval parameter, a hysteresis parameter, or the like. The description to follow will generally refer to one of these types of signal information (e.g., the signal strength parameter) but equally applies to another type of signal information or a combination of two or more types of signal information.

With respect to the signal strength parameter, for example, many different types of communication sessions may be established between user device 210 and base station 220, and each type of communication session may be associated with a corresponding signal strength parameter. In some implementations, each type of communication session may be associated with a unique signal strength parameter. In some implementations, a particular type of signal strength parameter may be associated with more than one type of communication session. In addition, the handover parameters may be cell-specific, base station specific, or common across multiple cells and/or multiple base stations.

As shown in FIG. 4, process 400 may further include storing the handover parameters (block 420). For example, base station 220 may store the handover parameters. In some implementations, base station 220 may store the handover parameters in memory 330 or storage component 340. In some implementations, base station 220 may store the handover parameters in a location external to base station 220. During establishment of a communication session between user device 210 and base station 220, base station 220 may access the stored handover parameters to determine appropriate handover parameters based on the type of communication session. In some implementations, base station 220 may access the stored handover parameters to determine appropriate handover parameters after the communication session is established.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5B:
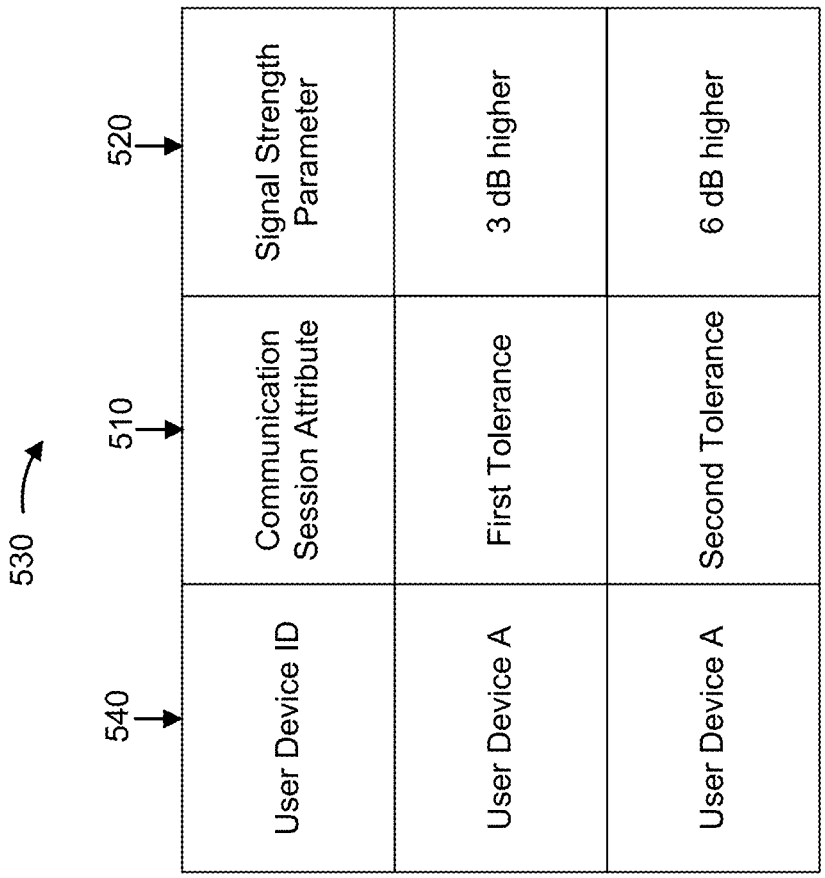
FIGS. 5A and 5B are diagrams of example data structures.
Figure 5A:
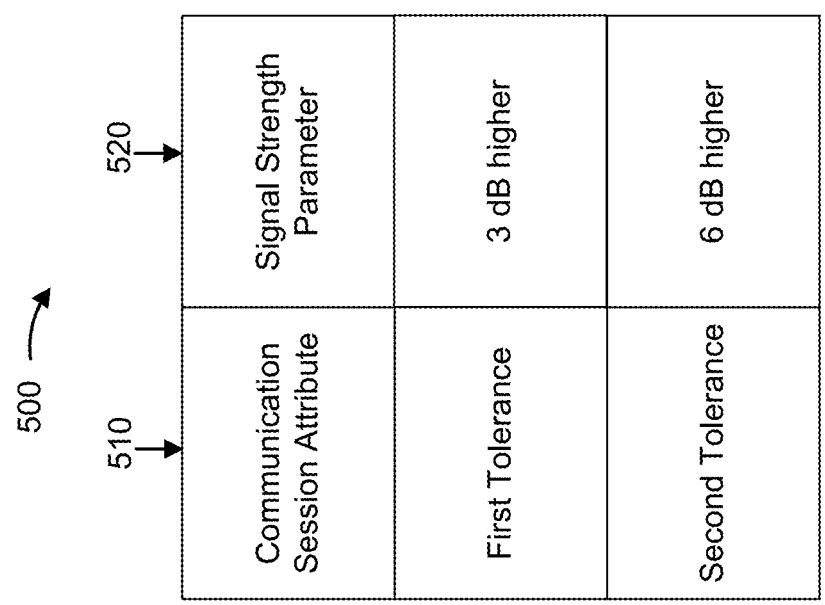

FIG. 5A illustrates an example data structure 500 that may be stored by base station 220 and/or one or more other devices, such as user device 210 and/or server 260.

As shown in FIG. 5A, data structure 500 may include a communication session attribute field 510 and a signal strength parameter field 520.

Communication session attribute field 510 may store information associated with different types of tolerances. A tolerance may be an ability of a communication session to withstand a change in the communication session without a noticeable effect in a quality of the communication session. In some implementations, the different types of tolerances may be based on a type of communication session. As shown in FIG. 5A, communication session attribute field 510 may include a first entry associated with a first tolerance and a second entry associated with a second tolerance. In some implementations, communication session attribute field 510 may include different any/or additional types of tolerances.

In some implementations, a communication session may include a voice session, a voice over internet protocol (VoIP) session, a streaming media session, a videoconferencing session, a download session, an upload session, a messaging session, a gaming session, or the like. Based on the type of communication session, an interruption in service and/or a change in a quality of the communication session may be noticeable to a user. For example, an interruption in service and/or change in a quality of a VoIP session or a streaming media session may be noticeable to a user. Therefore, a communication session associated with a VoIP session or a streaming media session may have a first tolerance (e.g., with respect to a communication session associated with a non-VoIP session or a non-streaming media session) for an interruption in service and/or a change in quality. Similarly, an interruption in service and/or change in a quality of a download session, an upload session, or a messaging session may not be noticeable to a user. Therefore, a communication session associated with a download session, an upload session, or a messaging session may have a second tolerance (e.g., with respect to a communication session associated with a VoIP session or a streaming media session) for an interruption in service and/or a change in quality. In some implementations, the first tolerance may be less than the second tolerance.

In some implementations, communication session attribute field 510 may include information identifying the communication session. For example, communication session attribute field 510 may include information identifying one or more communication sessions associated with the first tolerance (e.g., a VoIP session, a streaming session, or the like) and information identifying one or more communication sessions associated with the second tolerance (e.g., a download session, an upload session, a messaging session, or the like).

In some implementations, the communication session may be associated with a quality of service (QoS) class indicator (QCI) value. A QCI value may be used to identify characteristics of a packet and/or a bearer that carries the packet, such as the type of communication session associated with the packet and/or the bearer, a priority level of the packet and/or the bearer (e.g., a relative priority compared to other packets and/or bearers associated with different QCI classes), whether the packet and/or the bearer is associated with a guaranteed bit rate service or a non-guaranteed bit rate service, a permissible transmission delay associated with the packet and/or the bearer, a permissible packet error loss rate associated with the packet and/or the bearer, or the like.

A QCI value may include a value of 1 through 9, with QCI values 1 through 4 identifying guaranteed bit rate services, and QCI values 5 through 9 identifying non-guaranteed bit rate services. QCI 1 may identify packets associated with a conversational voice communication session. QCI 2 may identify packets associated with a conversational video communication session. QCI 3 may identify packets associated with a real-time gaming communication session. QCI 4 may identify packets associated with a streaming video communication session. QCI 5 may identify packets associated with an Internet Protocol multimedia subsystem (IMS) signaling communication session. QCIs 6, 8, and 9 may identify packets associated with streaming video, web, and/or e-mail communication sessions. QCI 7 may identify packets associated with a voice, video, and/or gaming communication session. In some implementations, QCI classes may have a particular priority order (e.g., priority order of QCI 5, QCI 1, QCI 3, QCI 2, QCI 4, QCI 6, QCI 7, QCI 8, and QCI 9, with QCI 5 having the highest priority and QCI 9 having the lowest priority). In some implementations, fewer, additional, different, or differently defined QCI classes and/or priority levels may be used.

Communication session attribute field 510 may include information identifying the QCI value associated with the communication session. For example, communication session attribute field 510 may include information identifying one or more communication sessions associated with the first tolerance (e.g., QCI values 1 through 4) and information identifying one or more communication sessions associated with the second tolerance (e.g., QCI values 5 through 9).

Communication session attribute field 510 may also include information associating a communication session and a corresponding QCI value. For example, the first tolerance field may include information identifying the communication session associated with the first tolerance (e.g., a VoIP session or a streaming media session) and the corresponding QCI values (e.g., QCI 2 or QCI 4). In addition, the second tolerance field may include information identifying the communication session associated with the second tolerance (e.g., a download session, an upload session, or a messaging session) and the corresponding QCI values (e.g., QCI 6, QCI 8, or QCI 9). In some implementations, communication session attribute field 510 may include a separate entry for each QCI value.

Signal strength parameter field 520 may store information associated with different signal strength parameters. For example, each type of communication session may be associated with a signal strength parameter. In some implementations, each type of communication session may be associated with a unique signal strength parameter. In some implementations, a particular signal strength parameter may be associated with more than one type of communication session.

As shown in FIG. 5A, signal strength parameter field 520 may include a first entry (e.g., 3 dB higher) associated with a first tolerance and a second entry (e.g., 6 dB higher) associated with a second tolerance. Based on the tolerance associated with the communication session, a particular signal strength, associated with another base station (e.g., base station 220-N), may be required for a handover event to occur. In some implementations, a handover of a communication session, associated with a first tolerance, from one base station to another base station (e.g., from base station 220 to base station 220-N) may occur if signals from base station 220-N have a signal strength that is at least 3 dB higher than a signal strength of signals from base station 220. In some implementations, a handover of a communication session, associated with a second tolerance, from base station 220 to base station 220-N may occur if a signal strength of signals from base station 220-N is at least 6 dB higher than a signal strength of signals from base station 220. In some implementations, data structure 500 may also, or alternatively, include one or more other fields corresponding to one or more other handover parameters including, for example, a signal quality parameter, a time to trigger parameter, a report interval parameter, and/or a hysteresis parameter.

FIG. 5B illustrates another example data structure 530 that may be stored by base station 220 and/or one or more other devices, such as user device 210 and/or server 260.

Assume that user device 210 has established a connection with base station 220, and the connection includes two communication sessions. As shown in FIG. 5B, data structure 500 may be updated, based on the established connection, to create data structure 530, which may include a user device identifier field 540 in addition to communication session attribute field 510 and signal strength parameter field 520.

User device identifier field 540 may store information identifying user device 210. As illustrated in FIG. 5B, user device identifier field 540 may store a device identifier (e.g., User Device A) associated with user device 210. In addition, user device identifier field 540 may store a device identifier associated with additional and/or different types of devices that are connected to base station 220. In some implementations, user device identifier field 540 may store a unique identifier associated with each user device 210.

In addition to user device identifier field 540, data structure 530 may include a communication session attribute field 510 and signal strength parameter field 520. As shown in FIG. 5B, communication session attribute field 510 may include an entry for each communication session associated with User Device A (and an entry for each communication session associated with other user devices). Signal strength parameter field 520 may also include an entry for each communication session associated with User Device A (and an entry for each communication session associated with other user devices).

While data structures 500 and 530 are shown to include a particular quantity and arrangement of fields, the fields shown in FIGS. 5A and 5B are for explanatory purposes only. In practice, data structures 500 and 530 may include additional fields, fewer fields, different fields, or differently arranged fields than are described with respect to data structures 500 and 530.

FIG. 6 is a flow chart of an example process 600 for managing handovers based on a type of communication session. In some implementations, one or more process blocks of FIG. 6 may be performed by base station 220. Additionally, or alternatively, one or more process blocks of FIG. 6 may be performed by another device or a group of devices separate from or including base station 220, such as user device 210 and/or server device 260.

As shown in FIG. 6, process 600 may include establishing a connection with a user device (block 610). For example, base station 220 may establish a connection with user device 210. In some implementations, the connection may be a radio resource control (RRC) connection. User device 210 may transmit a radio signal (e.g., via a cellular modem), and base station 220 may receive the radio signal. Base station 220 may perform various processing based on information included in the radio signal, or may provide information included in the radio signal to another device (e.g., a home subscriber server, an authentication server, an authorization server, an accounting server, a mobility management entity, etc.) for processing. The processing may include, for example, authenticating user device 210, performing handoff operations associated with user device 210 (e.g., when user device 210 changes location from a first cell site, associated with a first base station, to a second cell site, associated with a second base station), or the like. Base station 220 may establish a connection with user device 210 based on the processing (e.g., based on authenticating user device 210).

As further shown in FIG. 6, process 600 may include receiving communication information from user device 210 regarding a communication session (block 620) and determining a type of communication session based on the received communication information (block 630). For example, user device 210 may send communication information associated with a communication session to base station 220.

Base station 220 may receive and store the communication information associated with the communication session. Based on the communication information, base station 220 may determine a type of communication session (e.g., a VoIP session, a streaming media session, a videoconferencing session, a download session, an upload session, a messaging session, a gaming session, a session requiring QCI 2, or the like) based on data in the communication information (e.g., data identifying a communication session type, data identifying a QCI value, or some other data identifying a type of communication session. In some implementations, base station 220 may receive communication information regarding more than one communication session. In this case, base station 220 may determine a type of communication session for each communication session.

As further shown in FIG. 6, process 600 may include determining, based on the type of communication session, handover parameters (block 640). For example, base station 220 may determine appropriate handover parameters based on the type of communication session associated with user device 210.

In some implementations, the connection between user device 210 and base station 220 may be an RRC connection, and the RRC connection may include one or more bearers associated with the RRC connection (e.g., one or more bearers associated with user device 210 connected to base station 220 via the RRC connection). In addition, the one or more bearers may also include bearer attributes.

A bearer attribute may include, for example, a priority level assigned to a bearer. The priority level may indicate, for example, whether the bearer is associated with a real-time communication (e.g., a real-time voice call, a real-time video call, or the like), a non-real-time communication (e.g., browsing the web), a guaranteed bitrate communication, a non-guaranteed bitrate communication, a pre-emptible communication, a non-pre-emptible communication, or the like. The priority level may also, or alternatively, be based on a traffic handling priority, a transfer delay priority, latency information, a radio priority, or the like. Additionally, or alternatively, a bearer may be marked as a real-time bearer, a non-real-time bearer, a pre-emptible bearer, a non-pre-emptible bearer, a high priority bearer, a low priority bearer, or the like. The priority level may be indicated by a priority level identifier included in a packet carried via the bearer, in some implementations. The priority level identifier may include, for example, a QCI value.

Additionally, or alternatively, a bearer attribute may include information that identifies an end point associated with the bearer. Base station 220 may determine the end point based on an end point identifier (e.g., a source identifier, a destination identifier, etc.) included in a packet associated with the bearer. Additionally, or alternatively, a bearer attribute may include a protocol type associated with the bearer (e.g., transmission control protocol (TCP), user datagram protocol (UDP), etc.). Base station 220 may determine the protocol type based on a protocol identifier included in a packet associated with the bearer.

In some implementations, base station 220 may calculate a priority score based on the bearer attributes. As an example, base station 220 may determine that a bearer is a low priority bearer. Base station 220 may determine that the bearer is a low priority bearer by, for example, determining that the bearer is associated with a non-real-time communication (e.g., is not associated with a real time communication), is associated with a non-guaranteed bitrate communication (e.g., is not associated with a guaranteed bitrate communication), is associated with a pre-emptible communication (e.g., is not associated with a non-pre-emptible communication), is associated with a low priority level (e.g., a priority level below a threshold, a particular QCI class value that indicates a low priority level, or the like), is associated with a low priority score, or the like. As an example, base station 220 may determine that a bearer is a low priority bearer when the bearer does not carry a real-time voice call or a real-time video call.

Base station 220 may determine that a bearer is a low priority bearer by determining that one of the above conditions is satisfied, or by determining that a combination of the above conditions is satisfied. For example, base station 220 may determine that a bearer is a low priority bearer when the bearer is associated with a particular QCI class value. As another example, base station 220 may determine that a bearer is a low priority bearer when the bearer is associated with a non-real-time communication and is associated with a non-guaranteed bitrate communication.

Base station 220 may also determine that a bearer is a high priority bearer. Base station 220 may determine that the bearer is a high priority bearer by, for example, determining that the bearer is associated with a real-time communication (e.g., is not associated with a non-real time communication), is associated with a guaranteed bitrate communication (e.g., is not associated with a non-guaranteed bitrate communication), is associated with a non-pre-emptible communication (e.g., is not associated with a pre-emptible communication), is associated with a high priority level (e.g., a priority level above a threshold, a particular QCI class value that indicates a high priority level, or the like), is associated with a high priority score, or the like. For example, base station 220 may determine that a bearer is a high priority bearer when the bearer carries a real-time voice call, a real-time video call, or the like.

Base station 220 may determine that a bearer is a high priority bearer by determining that one of the above conditions is satisfied, or by determining that a combination of the above conditions is satisfied. For example, base station 220 may determine that a bearer is a high priority bearer when the bearer is associated with a particular QCI class value. As another example, base station 220 may determine that a bearer is a high priority bearer when the bearer is associated with a real-time communication and is associated with a guaranteed bitrate communication.

Based on the bearer attributes, base station 220 may determine appropriate handover parameters based on the information contained in data structure 500 and/or data structure 530. For example, if a bearer is a high priority bearer (e.g., the bearer carries a data communication with a QCI value of 1), base station 220 may determine that the signal strength parameter for the high priority bearer should be the signal strength parameter that corresponds to the first tolerance in communication session attribute field 510 (e.g., 3 dB higher).

In some implementations, more than one bearer may be established between user device 210 and base station 220. If the RRC connection includes multiple bearers, base station 220 may determine a priority level for a set of the bearers (e.g., all of the bearers or a subset of all of the bearers, or the like). For example, assume that two bearers (e.g., a bearer that carries a data communication with a QCI value of 1 and a bearer that carries a data communication with a QCI value of 9) are established. In some implementations, the bearer that carries the data communication with a QCI value of 1 may be considered a high priority bearer, and the bearer that carries the data communication with a QCI value of 9 may be considered a low priority bearer. Therefore, base station 220 may determine that the signal strength parameter for the high priority bearer (e.g., the bearer that carries the data communication with a QCI value of 1) should be the signal strength parameter that corresponds to the first tolerance in communication session attribute field 510 (e.g., 3 dB higher) and the signal strength parameter for the low priority bearer (e.g., the bearer that carries the data communication with a QCI value of 9) should be the signal strength parameter that corresponds to the second tolerance in communication session attribute field 510 (e.g., 6 dB higher).

In some implementations, handover parameters may be modified. For example, assume that a signal strength parameter for a high priority communication session indicates that a signal strength of signals from another base station should be at least 3 dB higher than a signal strength of signals from base station 220 to trigger a handover event. In some implementations, an offset value may be applied to the signal strength parameter to offset the signal strength parameter by a particular amount, thereby creating a modified signal strength parameter. The offset value may increase the signal strength parameter by a particular amount or decrease the signal strength parameter by a particular amount. For example, an offset value of +2 dB may increase the signal strength parameter from 3 dB to 5 dB. Similarly, an offset value of −2 dB may decrease the signal strength parameter from 3 dB to 1 dB. The modified signal strength parameter may be stored in signal strength parameter field 520.

In some implementations, an additional parameter may be added that is only active for particular bearers. For example, a bearer dependent offset may be introduced and may be activated for particular QCI values. Alternatively, or additionally, multiple bearer dependent offsets may be introduced. In this way, base station 220 may transmit the multiple bearer dependent offsets to user device 210 in an RRC Reconfiguration message. In some implementations, base station 220 may transmit one or more bearer dependent offsets, corresponding to a quantity of bearers established between user device 210 and base station 220, to user device 210.

In some implementations, the handover parameters may also, or alternatively, include information regarding a signal quality parameter, a time to trigger parameter, a report interval parameter, and/or a hysteresis parameter, and the signal quality parameter, the time to trigger parameter, the report interval parameter, and/or the hysteresis parameter may be modified. For example, the time to trigger parameter may be modified to expedite a handover of a communication session between user device 210 and base station 220 to another base station (e.g., base station 220-N).

In some implementations, handover parameters may be modified based on a quantity of handovers and/or a frequency of handovers of a previous communication session associated with a user device 210 and/or an active communication session associated with user device 210. For example, user device 210 may be handed over, from one base station 220 to another base station 220, many times. Based on the quantity of handovers and/or the frequency of handovers, base station 220 may determine that user device 210 is "ping-ponging" from one base station 220 to another base station 220. Base station 220 may determine this "ping-ponging" by, for example, tracking handover information associated with user device 210, receiving handover information from user device 210, receiving handover information from one or more neighboring base stations 220 (e.g., base station 220-N) that service user device 210, or the like.

Based on the handover information, base station 220 may, in some implementations, modify a signal strength parameter to reduce the quantity of handovers or the frequency of handovers. For example, base station 220 may, based on the handover information, increase one or more values in the signal strength parameter field 520. The modified signal strength parameter may be stored in signal strength parameter field 520.

As an example, assume that a VoIP session is established between user device 210 and base station 220. During the VoIP session, assume that user device 210 is handed over to base station 220-N and, at a later point in the VoIP session, is handed back to base station 220. This process may occur many times. If handovers occur at least a particular quantity of times or with a particular frequency, base station 220 may modify the value in the signal strength parameter field 520 corresponding to the VoIP session (e.g., the low tolerance communication session) by increasing the signal strength parameter (e.g., from 3 dB to 6 dB). In this way, the quantity of handovers or the frequency of handovers associated with the VoIP session and/or future low tolerance communication sessions may be reduced.

In some implementations, base station 220 may also modify the handover parameters based on a quantity of handovers and/or a frequency of handovers of previous communication sessions associated with one or more other user devices and/or active communication sessions associated with one or more other user devices. For example, the one or more other user devices may establish a connection with base station 220, and base station 220 may support many communication sessions with the one or more other user devices. In some implementations, base station 220 may monitor the previous and/or active communication sessions associated with the one or more other user devices and determine a quantity of handovers and/or a frequency of handovers associated with the previous and/or active communication sessions. Based on the quantity of handovers and/or the frequency of handovers associated with the previous and/or active communication sessions, base station 220 may modify the signal strength parameters associated with the communication sessions. The modified signal strength parameter may be stored in signal strength parameter field 520.

Assume that a communication session associated with the one or more other user devices 210 is a VoIP session. In addition, assume that the VoIP session is handed over from a first base station 220 to a second base station 220 a particular quantity of times (e.g., greater than a threshold quantity) or with a particular frequency (e.g., greater than a threshold frequency). Based on this handover information, the first or second base station 220 may modify the value in the signal strength parameter field 520 corresponding to the VoIP session (e.g., the low tolerance communication session) by increasing the signal strength parameter (e.g., from 3 dB to 6 dB). The first or second base station 220 may also transmit the new handover parameters to user device 210 prior to establishment of the VoIP session with user device 210 and/or after establishment of the VoIP session with user device 210.

In some implementations, base station 220 may modify the handover parameters based on a characteristic associated with user device 210. Assume that user device 210 is located in a moving vehicle. User device 210 may determine a velocity of user device 210 by measuring a quantity of handovers to different base stations or cells within a particular base station (e.g., base station 220) that occur during a particular period of time. If the determined velocity satisfies a particular threshold value, user device 210 may determine that user device 210 is a fast-moving device. User device 210 may transmit information indicating that user device 210 is a fast-moving device to base station 220.

In some implementations, base station 220 may determine a velocity associated with user device 210. For example, base station 220 may determine the velocity based on a rate of change in a timing advance during a particular period of time being greater than a particular threshold value. In some implementations, a timing advance may include an instruction to cause user device 210 to send a data block such that the data block is received by base station 220 in accordance with a time slot assigned to user device 210. If the determined velocity satisfies a particular threshold value, base station 220 may determine that user device 210 is a fast-moving device.

When user device 210 is considered a fast-moving device, base station 220 may, in some implementations, modify a signal strength parameter, store the modified signal strength parameter in single strength parameter field 520, and transmit modified handover parameters that include the modified signal strength parameter. In some implementations, user device 210 may, based on determining that user device 210 is a fast-moving device, select appropriate handover parameters and apply the selected handover parameters to the communication session.

As further shown in FIG. 6, process 600 may include transmitting the handover parameters to a user device (block 650). For example, base station 220 may transmit the handover parameters to user device 210 as part of an RRC Reconfiguration message. In some implementations, base station 220 may also, or alternatively, transmit modified handover parameters.

User device 210 may store the transmitted handover parameters and analyze the handover parameters to determine if user device 210 should perform an action. For example, user device 210 may monitor signals received from one or more other base stations (e.g., base station 220-N) in proximity to user device 210. User device 210 may determine, based on monitoring the signals received from the one or more other base stations, signal strength information for the one or more other base stations. In some implementations, the handover parameters may also, or alternatively, include information regarding a signal quality parameter, a time to trigger parameter, a report interval parameter, and/or a hysteresis parameter, and user device 210 may analyze one or more of these parameters to determine if user device 210 should perform an action.

When the signal strength information for the one or more other base stations satisfies the handover parameters, user device 210 may detect a handover event and may transmit the received signal strength information from the one or more other base stations to base station 220 as part of a measurement report. In some implementations, user device 210 may include information identifying the one or more other base stations in the measurement report, thereby providing an indication to base station 220 that another one or more base stations provide signals with signal strength that satisfies the handover parameters.

In some implementations, if a connection associated with user device 210 includes a single communication session, base station 220 may only transmit the handover parameters associated with the communication session to user device 210. In some implementations, if the connection associated with user device 210 includes two communication sessions (e.g., a high priority communication session and a low priority communication session), the handover parameters transmitted by base station 220 may include handover parameters for the communication session that is associated with the high priority and may not include handover parameters for the communication session that is associated with the low priority. In this way, the handover parameters may only include handover parameters for a highest priority communication session.

The transmitted handover parameters may include a signal strength parameter that indicates that a signal strength of another base station should be 3 dB greater than a signal strength associated with base station 220. When user device 210 receives signal strength information from another base station indicating that the other base station satisfies the handover parameters (e.g., a signal strength that is 3 dB higher than base station 220), user device 210 may provide this information to base station 220 in the measurement report.

In some implementations, user device 210 may establish a first communication session with base station 220 at a first time, and may establish a second communication session with base station 220 at a second, later time. Assume that the first communication session is a high priority communication session. Based on the high priority of the first communication session, base station 220 may transmit the appropriate handover parameters for this session. When the second communication session is established, base station 220 may determine a priority associated with the second communication session. If the second communication session is a lower priority communication session (relative to the high priority communication session), base station 220 may not transmit handover parameters for the second communication session. In some implementations, if the second communication session is a low priority communication session, base station 220 may transmit handover parameters associated with the low priority communication session in addition to transmitting handover parameters associated with the high priority communication session.

In some implementations, the first communication session may be a low priority communication session, and the second communication session may be a high priority communication session. Base station 220 may transmit handover parameters for the first communication session. When the second communication session is established, base station 220 may determine that the second communication session is a high priority communication session and may transmit handover parameters for the second communication session.

In some implementations, the handover parameters transmitted by base station 220 may include handover parameters for each communication session established by base station 220. For example, if the connection between user device 210 and base station 220 is an RRC connection and two bearers are associated with the RRC connection, the handover parameters transmitted by base station 220 may include handover parameters for each bearer. In this way, user device 210 may receive handover parameters associated with each bearer regardless of bearer priority.

In some implementations, the handover parameters transmitted by base station 220 may include handover parameters for each possible communication session. For example, if the connection between user device 210 and base station 220 is an RRC connection and two bearers are associated with the RRC connection, the handover parameters transmitted by base station 220 may include handover parameters for each possible bearer. In this way, user device 210 may receive handover parameters associated with each possible bearer even though only two bearers are associated with the RRC connection. Based on receiving the handover parameters, user device 210 may determine the appropriate handover parameters for the two bearers from the handover parameters associated with each possible bearer. In some implementations, base station 220 may transmit the handover parameters associated with each possible bearer in a single RRC Reconfiguration message, thereby saving signaling bandwidth and providing user device 210 with additional control over detecting a handover event.

In some implementations, base station 220 may transmit modified handover parameters. Assume that user device 210 has established a communication session with base station 220. Based on a quantity of handovers and/or a frequency of handovers of the communication session associated with user device 210 and/or other user devices, base station 220 may modify a signal strength parameter stored in data structure 500 and/or data structure 530 to reduce the quantity of handovers and/or the frequency of handovers. Based on modifying the signal strength parameter, base station 220 may transmit modified handover parameters, including the modified signal strength parameter, to user device 210 during the communication session.

In some implementations, the communication session between user device 210 and base station 220 may be established after base station 220 transmits the handover parameters to user device 210. Alternatively, or additionally, the communication session between user device 210 and base station 220 may be established before base station 220 transmits the handover parameters to user device 210. In this way, base station 220 may transmit the handover parameters to user device 210 prior to establishment of the communication session and/or after establishment of the communication session.

As further shown in FIG. 6, process 600 may include receiving the measurement report and analyzing information included in the measurement report (block 660). For example, base station 220 may receive the measurement report from user device 210 and may analyze the information included in the measurement report. In some implementations, base station 220 may receive the measurement report when user device 210 determines signal strength information of signals from another base station that satisfies the handover parameters.

As further shown in FIG. 6, process 600 may include determining that a handover is appropriate based on the measurement report (block 670). For example, base station 220 may, based on analyzing the information included in the measurement report, determine that the communication session between user device 210 and base station 220 should be handed over to another base station (e.g., base station 220-N).

Assume that user device 210 determines signal strength information of signals from base station 220-N that indicates that base station 220-N satisfies the handover parameters (e.g., a signal strength that is 3 dB higher than base station 220). When base station 220 receives this information in the measurement report, base station 220 may determine that base station 220-N satisfies the handover parameters. Based on determining that base station 220-N satisfies the handover parameters, base station 220 may determine that the communication session should be handed over to base station 220-N.

As further shown in FIG. 6, process 600 may include beginning a handover operation (block 680). For example, base station 220 may, based on determining that the communication session should be handed over to base station 220-N, begin the handover operation.

In some implementations, base station 220 may transmit a message to user device 210 to instruct user device 210 to hand over the communication session to base station 220-N. In some implementations, the message may include a "change cell" command. Based on receiving the message, user device 210 may perform the handover process by establishing a connection with base station 220-N. After the connection is established, base station 220 may receive information from user device 210 and/or base station 220-N indicating that the connection is established. In some implementations, user device 210 may transmit a "cell change completion" message to base station 220. Based on the information indicating that the connection is established, base station 220 may terminate the communication session.

In some implementations, the connection between user device 210 and base station 220 may include a single communication session. Therefore, when base station 220 terminates the single communication session, base station 220 may also terminate the connection (and may tear down the bearer). In some implementations, base station 220 may terminate the connection as the connection to base station 220-N is established. In this way, user device 210 has only a single connection to any base station at a given time. In some implementations, base station 220 may terminate the connection after the connection to base station 220-N is established.

In some implementations, the connection between user device 210 and base station 220 may include several communication sessions. Therefore, when base station 220 terminates the communication session that is handed over to base station 220-N, base station 220 may maintain the connection with user device 210 and continue to service the other communication sessions. In some implementations, base station 220 may hand over more than one communication session even though only one of these communication sessions was involved in the handover event.

In some implementations, base station 220 may transmit an instruction to base station 220-N to instruct base station 220-N to establish a connection with user device 210. Based on receiving the message, base station 220-N may perform the handover process by establishing a connection with user device 210. After the connection is established, base station 220 may receive information from user device 210 and/or base station 220-N indicating that the connection is established. Based on the information indicating that the connection is established, base station 220 may terminate the communication session. In some implementations, base station 220 may terminate the connection as the connection to base station 220-N is established.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of managing handovers based on handover parameters.

Figure 7A:
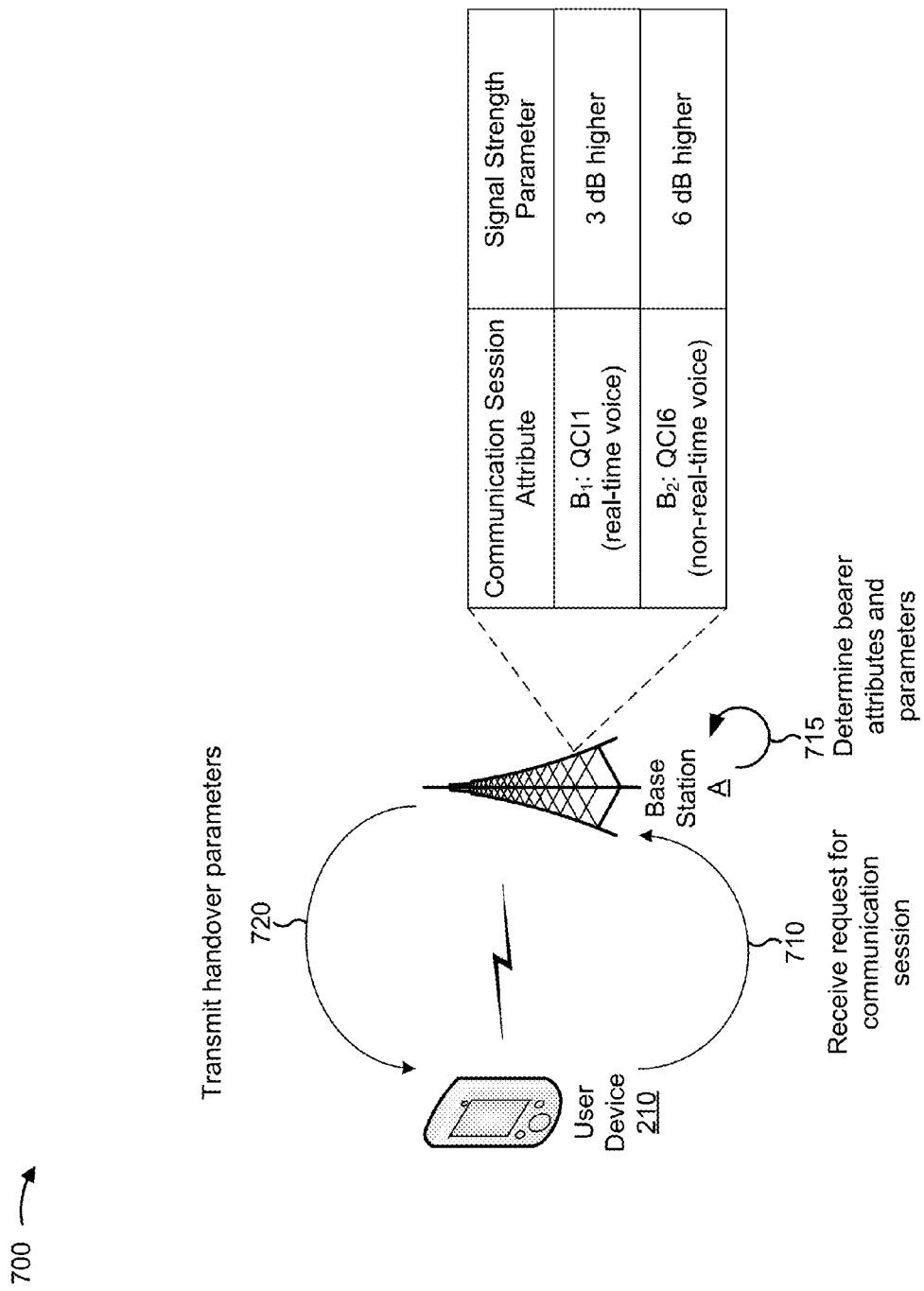
FIGS. 7A-7D are diagrams of an example implementation relating to the example process shown in FIG. 6.

As shown in FIG. 7A, and by reference number 710, assume that base station 220, shown as base station A, receives a request from user device 210 for a communication session provided by a bearer associated with an RRC connection established between user device 210 and base station A. As shown by reference number 715, assume that base station A determines bearer attributes associated with the bearer based on a type of communication session associated with the bearer (e.g., the bearer is a high priority bearer ($B_1$), which carries a real-time voice communication with a QCI value of 1). As shown, assume that base station A determines, based on the information included in data structure 500, a signal strength parameter for the bearer (e.g., 3 dB higher). As shown by reference number 720, base station A determines, based on the bearer attributes and signal strength parameter, handover parameters, and transmits the handover parameters to user device 210.

Figure 7B:
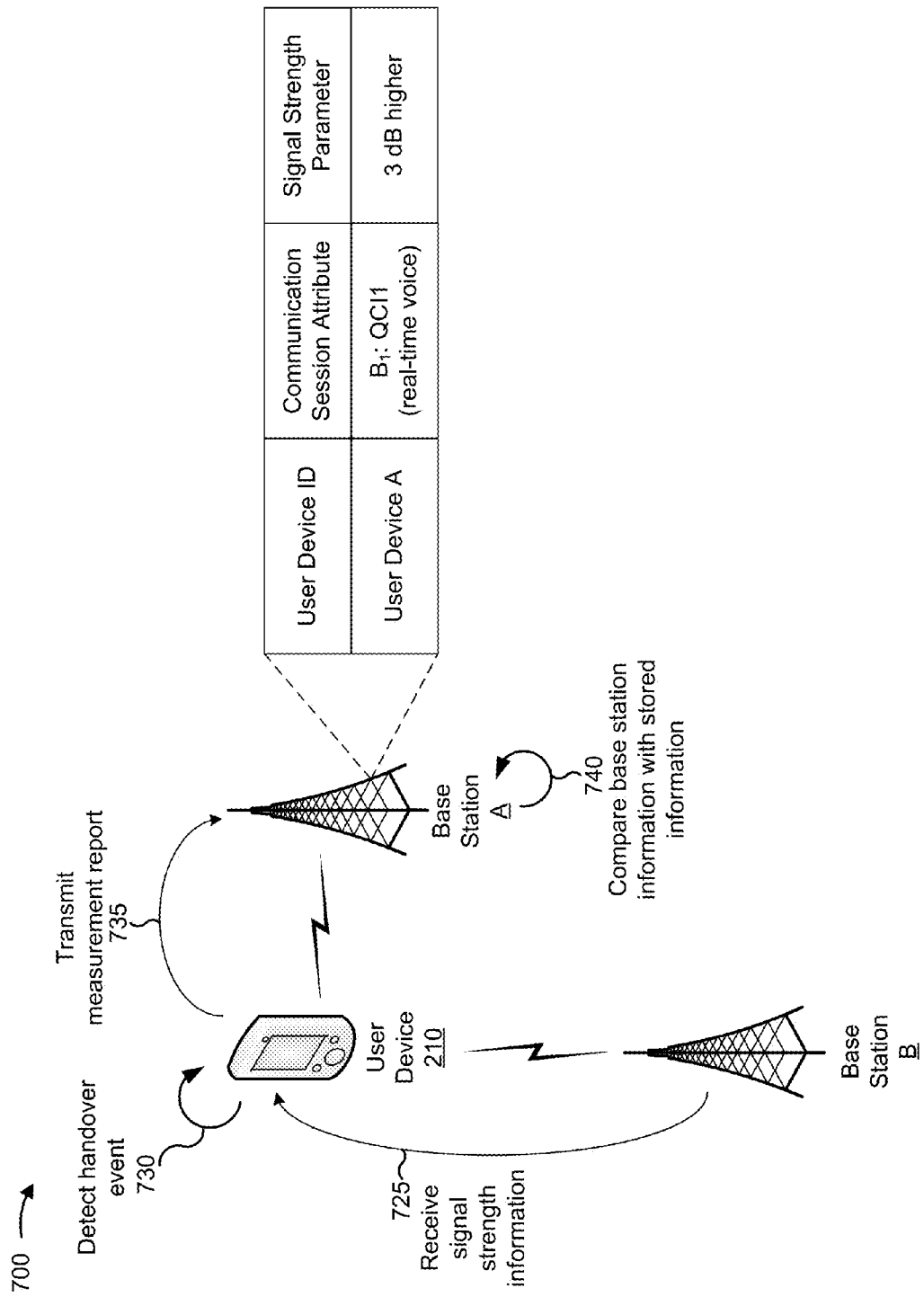

As shown in FIG. 7B, and by reference number 725, assume that during the communication session associated with the bearer, user device 210 receives signals from base station 220, shown as base station B, and determines signal strength information of the signals. Assume that the signal strength information for base station B indicates that base station B has a signal strength that is at least 3 dB higher than a signal strength associated with base station A. As shown by reference number 730, user device 210 may detect a handover event based on the signal strength information indicating that base station B has a signal strength that is 5 dB higher than a signal strength associated with base station A. Based on detecting the handover event, user device 210 may transmit a measurement report, including the signal strength information associated with base station B, to base station A, as shown by reference number 735. As shown by reference number 740, based on the signal strength information associated with base station B, base station A may access data structure 530, determine the bearer associated with user device 210, compare the signal strength information to the stored signal strength parameter for the bearer, and determine that the signal strength information satisfies the signal strength parameter.

Figure 7C:
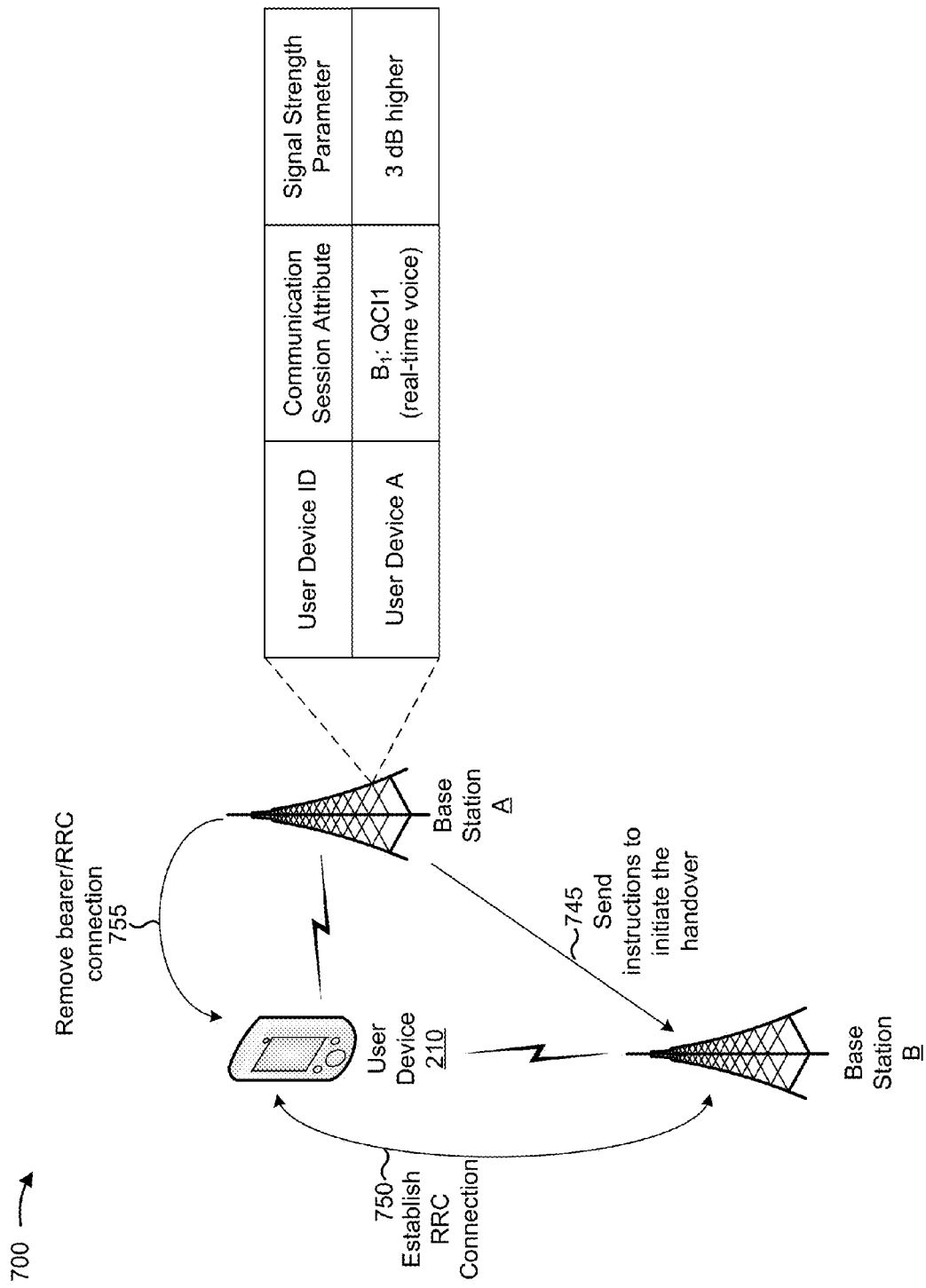

As shown in FIG. 7C, and by reference number 745, assume that base station A sends instructions to base station B to initiate the handover of the bearer. As shown by reference number 750, user device 210 and base station B may establish an RRC connection and a bearer. As shown by reference number 755, base station A may terminate the RRC connection (and may tear down the bearer) as the RRC connection from user device 210 to base station B is established or after the RRC connection from user device 210 to base station B is established.

Figure 7D:
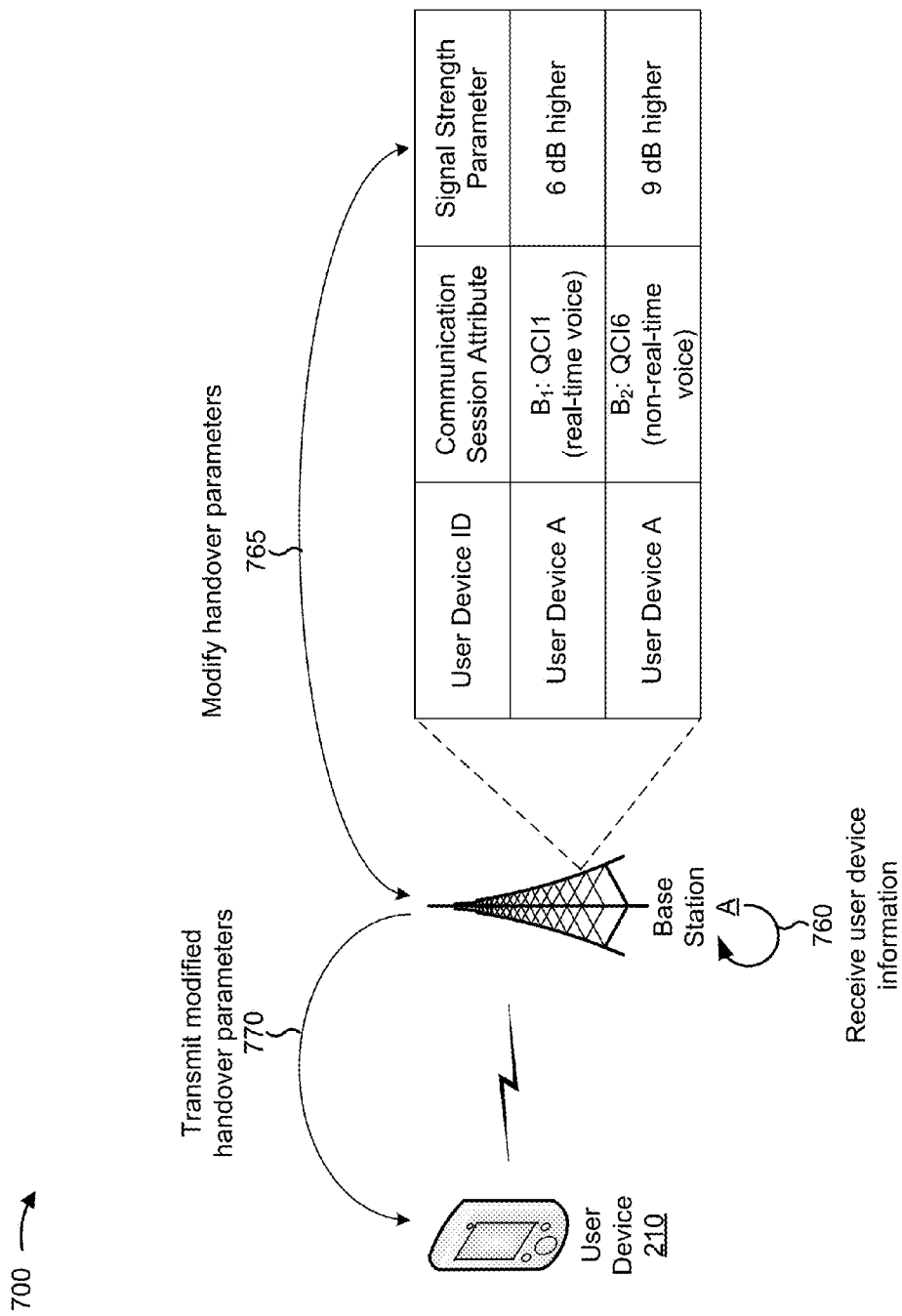

As shown in FIG. 7D, and by reference number 760, assume that base station A has established another RRC connection with user device 210 at a later time, and the other RRC connection includes two communication sessions that are provided by two bearers. Each bearer may be associated with a different priority (e.g., a first bearer is a high priority bearer ($B_1$), which carries a real-time voice communication with a QCI value of 1, and a second bearer is a low priority bearer ($B_6$), which carries a real-time voice communication with a QCI value of 6). During the other RRC connection, base station A may receive, from user device 210, user device information indicating, for example, that user device 210 is "ping-ponging" between base station A and another base station (e.g., base station B) and/or that user device 210 is a fast-moving (e.g., moving at a velocity that is greater than a threshold) device.

As shown by reference number 765, base station A may, based on the received user device information, modify one or more parameters in data structure 530 (e.g., modify the signal strength parameter associated with high priority bearer ($B_1$) to require a signal strength of 6 dB higher than a signal strength of base station A and modify the signal strength parameter associated with low priority bearer ($B_6$) to require a signal strength of 9 dB higher than a signal strength of base station A) to create modified handover parameters. As shown by reference number 770, base station A may transmit the modified handover parameters to user device 210 for use during the other RRC connection.

As indicated above, FIGS. 7A-7D are provided merely as an example. Other examples are possible and may differ from what was described with regard to FIGS. 7A-7D.

Implementations described herein associate handover parameters with different types of communication sessions, and the handover parameters may be used to determine if a communication session should be handed over when the handover parameters, associated with the communication session, are satisfied.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
   a memory to store instructions; and
   one or more processors to execute the instructions to:
   receive information regarding a communication session associated with a user device,
      the information being provided by the user device;
   determine, based on receiving the information, a type of the communication session of one or more types of communication sessions;
   determine, based on determining the type of the communication session, handover parameters associated with the communication session,
      the handover parameters comprising a signal strength parameter, of one or more signal strength parameters, associated with the type of the communication session,
      each of the one or more signal strength parameters:
         being associated with a respective type of the one or more types of communication sessions, and
         comprising information indicating a respective minimum difference in signal strength between a current base station and another base station for enabling a handover operation associated with the user device;
   transmit the handover parameters to the user device;
   receive, from the user device, information associated with signal information for one or more other devices;
   determine whether the information associated with the signal information satisfies the signal strength parameter associated with the type of the communication session; and
   initiate, based on determining the information associated with the signal information satisfies the signal strength parameter associated with the type of the communication session, the handover operation associated with the user device.

2. The device of claim 1, where the one or more processors, when receiving the information regarding the communication session, are to:
   receive information regarding a first communication session associated with the user device; and
   receive information regarding a second communication session associated with the user device; and where the one or more processors, when determining the handover parameters associated with the communication session, are to:
  determine first handover parameters associated with the first communication session; and
  determine second handover parameters associated with the second communication session,
    the first handover parameters being different than the second handover parameters.

3. The device of claim 1, where the one or more processors, when determining the type of the communication session of the one or more types of communication session, are to:
  determine the type of the communication session, of the one or more types of communication sessions, prior to establishing the communication session, and
  where the one or more processors, when transmitting the handover parameters to the user device, are to:
    transmit the handover parameters to the user device prior to establishing the communication session.

4. The device of claim 1, where the one or more processors are further to:
  determine, based on the type of the communication session of the one or more types of communication sessions, priority information associated with the communication session,
  where the one or more processors, when determining the handover parameters associated with the communication session of the one or more types of communication sessions, are to:
    determine the handover parameters based on the priority information associated with the communication session of the one or more types of communication sessions.

5. The device of claim 1, where the one or more processors are further to:
  modify, based on receiving user device information associated with the user device, the handover parameters.

6. The device of claim 5, where the user device information includes at least one of:
  a quantity of prior handovers associated with the user device,
  a frequency of prior handovers associated with the user device, or
  velocity information associated with the user device.

7. The device of claim 1, where the signal strength parameter is associated with an ability to withstand a change in the communication session without a noticeable effect in a quality of the communication session.

8. A non-transitory computer-readable medium storing instructions, the instructions comprising:
  one or more instructions that, when executed by one or more processors of a device, cause the one or more processors to:
    receive information regarding a communication session associated with a user device,
      the information being provided by the user device;
    determine, based on receiving the information, a type of the communication session of one or more types of communication sessions;
    determine, based on determining the type of the communication session, handover parameters associated with the communication session,
      the handover parameters comprising a signal strength parameter, of one or more signal strength parameters, associated with the type of the communication session,
      each of the one or more signal strength parameters:
        being associated with a respective type of the one or more types of communication sessions, and
        comprising information indicating a respective minimum increase in signal strength, from a first base station to a second base station, for causing a handover operation associated with the user device;
    transmit the handover parameters to the user device;
    receive, from the user device and based on transmitting the handover parameters, signal information associated with one or more other devices;
    determine whether the signal information, associated with the one or more other devices, satisfies the signal strength parameter of the type of the communication session; and
    initiate, based on determining the signal information satisfies the signal strength parameter of the type of the communication session, the handover operation associated with the user device.

9. The non-transitory computer-readable medium of claim 8, where the one or more instructions, that cause the one or more processors to determine the type of the communication session of the one or more types of communication sessions, cause the one or more processors to:
  determine that a first type of communication session, of the one or more types of communication sessions, is associated with a first priority; and
  determine that a second type of communication session, of the one or more types of communication sessions, is associated with a second priority,
    the first priority being greater than the second priority.

10. The non-transitory computer-readable medium of claim 9, where the one or more instructions, that cause the one or more processors to determine the handover parameters, cause the one or more processors to:
  determine first handover parameters for the first type of communication session; and
  determine second handover parameters for the second type of communication session.

11. The non-transitory computer-readable medium of claim 10, where the one or more instructions, that cause the one or more processors to transmit the handover parameters, cause the one or more processors to:
  transmit, to the user device, the first handover parameters and the second handover parameters.

12. The non-transitory computer-readable medium of claim 10, where the one or more instructions, that cause the one or more processors the handover parameters, cause the one or more processors to:
  transmit, to the user device, the first handover parameters without transmitting, to the user device, the second handover parameters.

13. The non-transitory computer-readable medium of claim 8, where the one or more instructions, when executed by the one or more processors, further cause the one or more processors to:
  modify the handover parameters by applying an offset value to signal parameter information associated with the handover parameters.

14. A method comprising:
  receiving, by a device, information regarding a communication session associated with a user device,
    the information being provided by the user device;

determining, by the device and based on receiving the information, a type of the communication session of one or more types of communication sessions;

determining, by the device and based on determining the type of the communication session, handover parameters associated with the communication session, the handover parameters comprising a signal strength parameter, of one or more signal strength parameters, associated with the type of the communication session, each of the one or more signal strength parameters:
being associated with a respective type of the one or more types of communication sessions, and
comprising information indicating a respective minimum difference in signal strength, between base stations, for a handover operation associated with the user device to occur;

transmitting, by the device, the handover parameters to the user device;

receiving, by the device and from the user device, information, associated with signal information of signals received from one or more other devices, based on a handover event determined by the user device;

determining, by the device, whether the information, associated with the signal information, satisfies the signal strength parameter associated with the type of the communication session; and handing over, by the device and based on determining the information, associated with the signal information, satisfies the signal strength parameter associated with the type of the communication session, the communication session to one of the one or more other devices.

15. The method of claim 14, where transmitting the handover parameters to the user device includes:

transmitting respective handovers parameters for the one or more types of communication sessions, the respective handovers parameters being received by the user device and processed to determine the handover parameters, of the respective handover parameters, associated with the type of the communication session.

16. The method of claim 14, where receiving the information regarding the communication session includes:

receiving information regarding a first communication session associated with the user device; and receiving information regarding a second communication session associated with the user device, and where determining the handover parameters associated with the communication session includes:

determining first handover parameters associated with the first communication session; and determining second handover parameters associated with the second communication session, the first handover parameters being different than the second handover parameters.

17. The method of claim 16, where transmitting the handover parameters includes:

transmitting, to the user device, the first handover parameters without transmitting, to the user device, the second handover parameters.

18. The method of claim 14, further comprising:

modifying, based on receiving user device information associated with the user device, the handover parameters, the user device information including at least one of:
a quantity of prior handovers associated with the user device,
a frequency of prior handovers associated with the user device, or
velocity information associated with the user device.

19. The method of claim 14, where the signal information includes at least one of:

signal strength information,
signal quality information,
time to trigger information,
report interval information, or
hysteresis information.

20. The method of claim 14, where determining the type of the communication session of the one or more types of communication sessions includes:

determining the type of the communication session, of the one or more types of communication sessions, prior to establishing the communication session, and where transmitting the handover parameters to the user device includes:

transmitting the handover parameters to the user device prior to establishing the communication session.

* * * * *